(12) United States Patent
Mazzocca

(10) Patent No.: US 9,011,131 B2
(45) Date of Patent: Apr. 21, 2015

(54) LUG TYPE EXTRUDER SCREW

(75) Inventor: Timothy D. Mazzocca, Ontario (CA)

(73) Assignee: RMS Equipment LLC, Akron, OH (US)

( * ) Notice: Subject to any disclaimer, the term of this patent is extended or adjusted under 35 U.S.C. 154(b) by 952 days.

(21) Appl. No.: 13/036,148

(22) Filed: Feb. 28, 2011

(65) Prior Publication Data

US 2011/0222363 A1 Sep. 15, 2011

Related U.S. Application Data

(60) Provisional application No. 61/312,849, filed on Mar. 11, 2010.

(51) Int. Cl.
| | | |
|---|---|---|
| *B28B 17/02* | (2006.01) | |
| *B29C 47/62* | (2006.01) | |
| *B29B 7/42* | (2006.01) | |
| *B29C 47/60* | (2006.01) | |
| *B29C 47/00* | (2006.01) | |
| *B29C 47/08* | (2006.01) | |

(52) U.S. Cl.
CPC ............... *B29C 47/62* (2013.01); *B29B 7/421* (2013.01); *B29C 47/60* (2013.01); *B29C 47/605* (2013.01); *B29C 47/6043* (2013.01); *B29C 47/6075* (2013.01); *B29C 47/0009* (2013.01); *B29C 47/0825* (2013.01)

(58) Field of Classification Search
CPC .... B29B 7/421; B29C 47/60; B29C 47/0009; B29C 47/605; B29C 47/0825
USPC ................ 425/205, 208, 200, 207; 366/81
See application file for complete search history.

(56) References Cited

U.S. PATENT DOCUMENTS

| | | |
|---|---|---|
| 2,838,794 A | 6/1958 | Munger et al. |
| 3,487,503 A | 1/1970 | Barr et al. |
| 3,632,254 A | 1/1972 | Woodham et al. ............ 425/205 |
| 3,664,795 A | 5/1972 | Heinz et al. |
| 3,671,141 A | 6/1972 | Kovacs |
| 3,687,423 A * | 8/1972 | Koch et al. ..................... 366/81 |
| 3,751,015 A | 8/1973 | Hensen et al. ................ 259/191 |

(Continued)

FOREIGN PATENT DOCUMENTS

| | | |
|---|---|---|
| CN | 1787905 | 6/2006 |
| JP | 48-100479 | 12/1973 |

(Continued)

OTHER PUBLICATIONS

Search Report in corresponding French application No. 11 02492 completed Apr. 4, 2012.

(Continued)

*Primary Examiner* — Yogendra Gupta
*Assistant Examiner* — Ninh Le
(74) *Attorney, Agent, or Firm* — Brinks Gilson & Lione

(57) ABSTRACT

An extruder screw that enables mixing of viscous materials, such as rubber mixtures and thermoplastic materials, is disclosed. The screw includes a core extending from a sealing end to a nose cone end. At least one flight extends radially from the core in a quasi-helical pattern, wherein flights adjacent one another form channels therebetween. A plurality of elongate lugs extend radially from the core and are disposed in the channels. The shape as well as the number of lugs can be varied to ensure the requirements for a thorough and turbulent deflection and mixing of the material stream.

14 Claims, 3 Drawing Sheets

(56) References Cited

U.S. PATENT DOCUMENTS

| | | | |
|---|---|---|---|
| 3,998,438 A | 12/1976 | Sokolow | 259/191 |
| 4,092,015 A | 5/1978 | Koch | 366/81 |
| 4,312,265 A | 1/1982 | Enterline et al. | 99/348 |
| 4,659,230 A | 4/1987 | Son et al. | 366/343 |
| 4,798,473 A * | 1/1989 | Rauwendaal | 366/89 |
| 5,961,209 A * | 10/1999 | Kovacevic | 366/89 |
| 5,975,449 A | 11/1999 | Geyer | 241/260.1 |
| 6,132,076 A * | 10/2000 | Jana et al. | 366/81 |
| 2004/0257904 A1* | 12/2004 | Zhang et al. | 366/81 |
| 2009/0027994 A1 | 1/2009 | Grutter et al. | 366/79 |
| 2010/0310693 A1* | 12/2010 | Klee | 425/113 |

FOREIGN PATENT DOCUMENTS

| | | | |
|---|---|---|---|
| JP | 50-126066 | 10/1975 | |
| JP | 51121072 | 10/1976 | B29B 7/00 |
| JP | 55053543 | 4/1980 | B29F 3/02 |
| JP | 56007863 | 2/1981 | B29B 7/00 |
| JP | 2-113918 | 4/1990 | |
| WO | WO 2009068151 A1 * | 6/2009 | B29C 47/62 |

OTHER PUBLICATIONS

Office Action for Chinese Patent Application 201110057846.5 dated May 5, 2014, 15 pgs.

Search Report and Opinion for Dutch Patent Application 2006334 dated Jul. 11, 2012, 6 pgs.

Official Letter indicating Patent Grant for Dutch Patent Application 2006334 dated Sep. 24, 2012, 2 pgs.

* cited by examiner

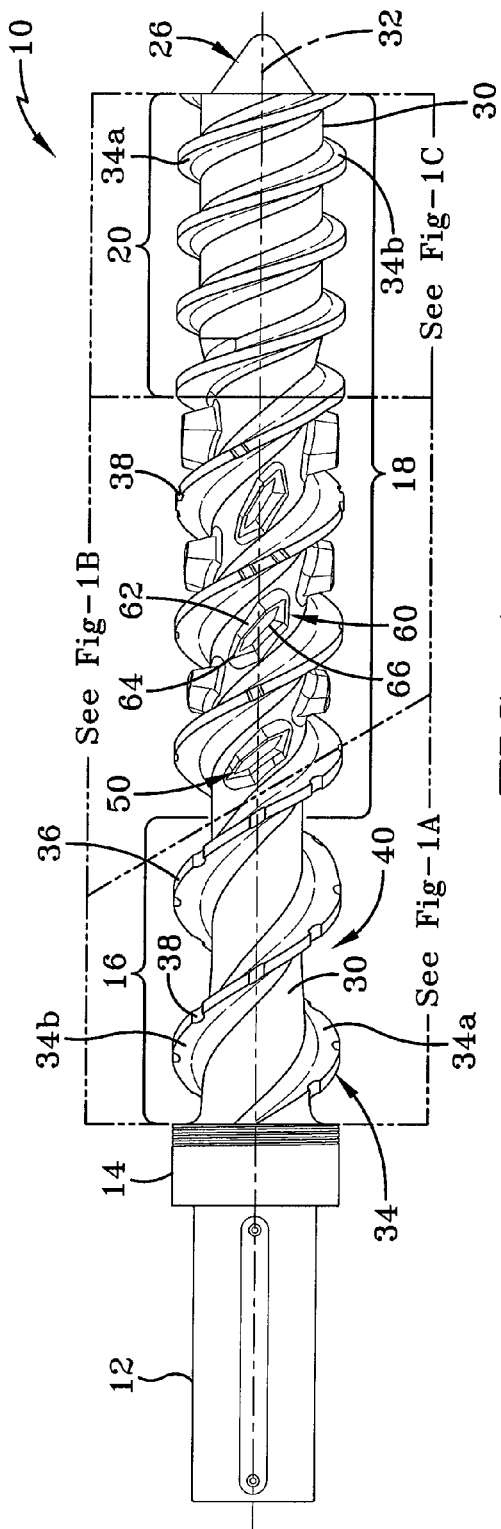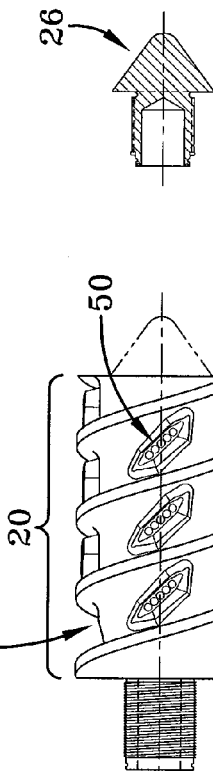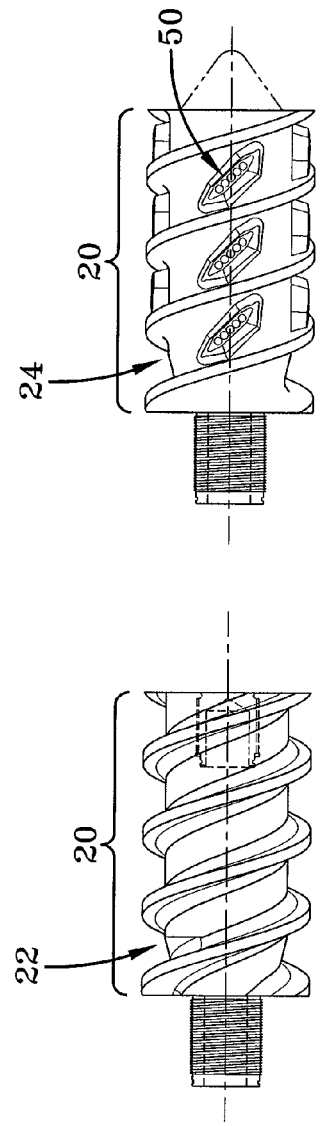

LUG TYPE EXTRUDER SCREW

CROSS-REFERENCE TO RELATED APPLICATIONS

This application claims priority of U.S. Provisional Application Ser. No. 61/312,849 filed Mar. 11, 2010, which is incorporated herein by reference.

TECHNICAL FIELD

The invention relates to a method and apparatus for the processing or mixing of highly viscous materials such as rubber mixtures in a single screw extruder. More particularly, the present invention relates to an extruder screw which has a thread flight with a mixing region that includes a plurality of mixing lugs that have varied angles and heights with respect to flights of the extruder screw.

BACKGROUND ART

It is known in the art of processing or mixing highly viscous materials, such as rubber, to subject the material to a kneading and blending in an extruder having a screw rotating inside a housing section. The screw can have a single flight or a plurality of flights of the screw thread. The pitch or lead of any flight as well as the depth of the screw channel between the flights can be constant or variable. In the method, different mixing means are used to achieve a satisfactory blending of the material during its feed along the screw.

It is for instance known to change the lead or pitch of the screw flights at periodic or variable intervals or to interpolate reversibly directed flights of the screw threads or to interrupt the thread of the screw by gaps. As the screw rotates, the material is directed into vortex-like patterns that bring about a blending of the various and irregular flow paths caused by these mixing means.

Although prior art extruder screws have used pins or ramps between screw flights to facilitate mixing, these embodiments have still been found to be somewhat limited in their ability to fully mix the rubber material. Accordingly, there is a need in the art to provide an extruder screw with lugs that permit mixing of rubber or other polymeric material while still allowing the material to flow easily through the housing section without adversely affecting the material's flow rate or the molecular structure of the material.

SUMMARY OF THE INVENTION

In light of the foregoing, it is a first aspect of the present invention to provide a lug type extruder screw.

It is the object of the invention to achieve a satisfactory mixing and homogenizing effect of the material in the processing of highly viscous materials with a high material flow rate through the extruder. According to the invention the material flow is substantially in a forward-directed movement through the extruder. The extruder comprises of a single screw rotating inside a housing section with a plurality of obstacles, such as shaped lugs, which are attached to a root area between the screw threads. The thickness, shape and number of these lugs can be varied according to the materials subjected to mixing and the degree of mixing desired.

The flow path of the material through the extruder and along the screw is therefore subject to local vortex formations of the material. At the interface between the material and the housing section and the screw thread, respectively, there is a continuous change in the surfaces within the material which comes in contact, bringing about an intensive exchange of material and heat.

Furthermore, in cooperation with the screw, there is elevation, to a large extent, in the shearing flow within the material as a result of high pressure gradients. In addition a high material flow rate is possible accomplished by an optimum mechanical and thermal homogeneity of the extruded product.

The lugs are selectively arranged along the root channel of the screw. The shape of all or any of the lugs can be provided with a desired shape or the like to increase or decrease flow resistance.

Another aspect of the present invention is to provide an extruder screw adapted for receipt in a barrel of an extruder comprising a core extending from a sealing end to a nose cone end, at least one flight extending radially from the core in a quasi-helical pattern, wherein flights adjacent one another form channels therebetween, and a plurality of elongate lugs extending radially from the core and are disposed in the channels.

BRIEF DESCRIPTION OF THE DRAWINGS

For a complete understanding of the objects, techniques and structure of the invention, reference should be made to the following detailed description and accompanying drawings, wherein:

FIG. 1 shows an elevational view of an extruder screw in accordance with the concepts of the present invention, wherein the screw comprises at least a drive end, a collecting section, a mixing section, a changeable extrusion section and a changeable nose cone end;

FIGS. 1A-1C show detailed views of the extruder screw in accordance with the concepts of the present invention, wherein FIG. 1A shows a detailed view of the collection section, FIG. 1B shows a detailed view of the mixing section; and FIG. 1C shows a detailed view of the changeable extrusion section;

FIG. 2 shows an elevational view of the changeable extrusion section without lugs according to the concepts of the present invention;

FIG. 3 shows an elevational view of the changeable extrusion section with lugs according to the concepts of the present invention;

FIG. 4 shows an elevational view of the changeable nose end of the single screw according to the concepts of the present invention.

BEST MODE FOR CARRYING OUT THE INVENTION

Figure 1A:
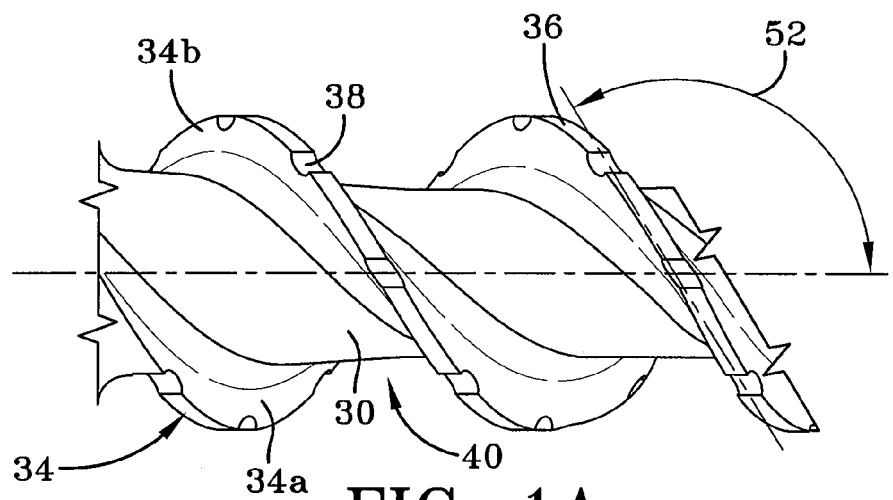
Figure 1B:
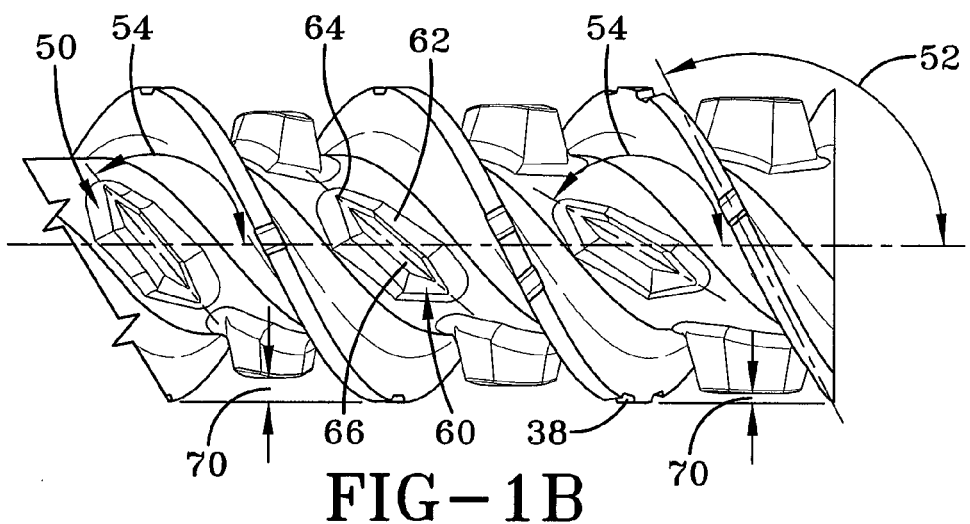
Figure 1C:
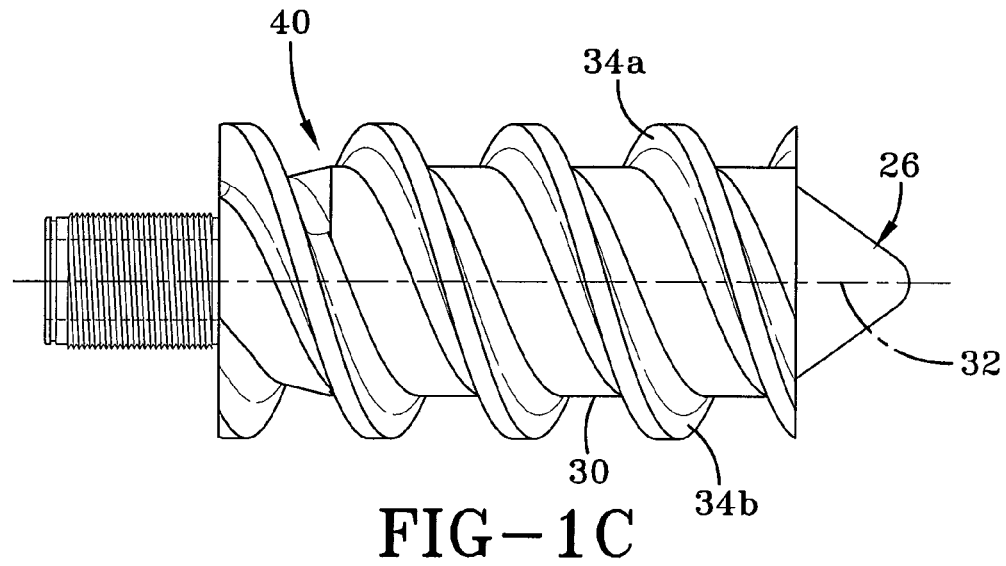
Figure 5A:
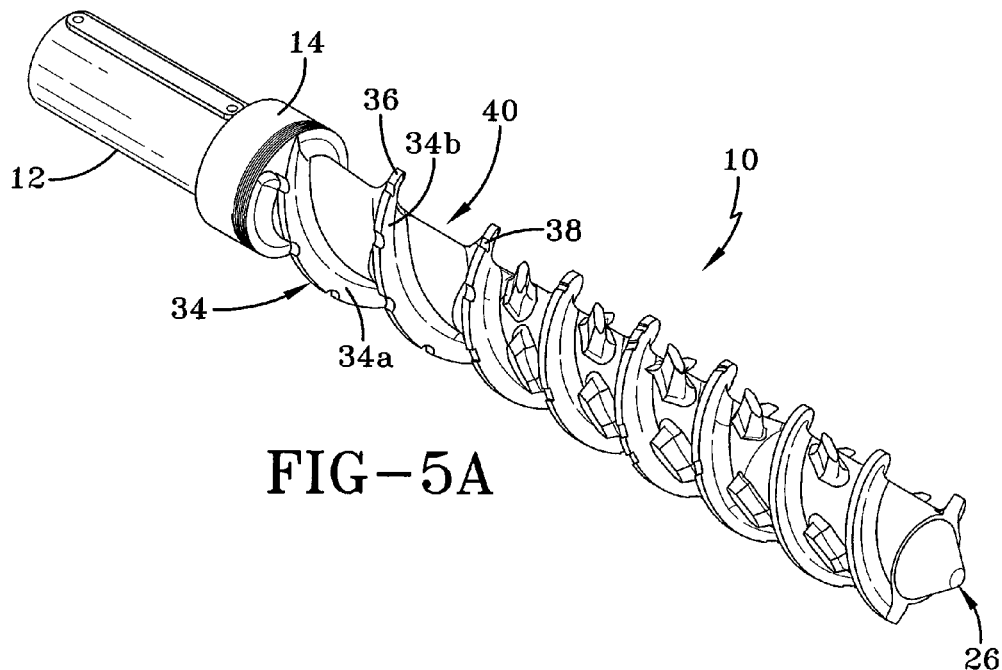
FIGS. 5A and 5B show perspective views of the extruder screw made in accordance with the concepts of the present invention.
Figure 5B:
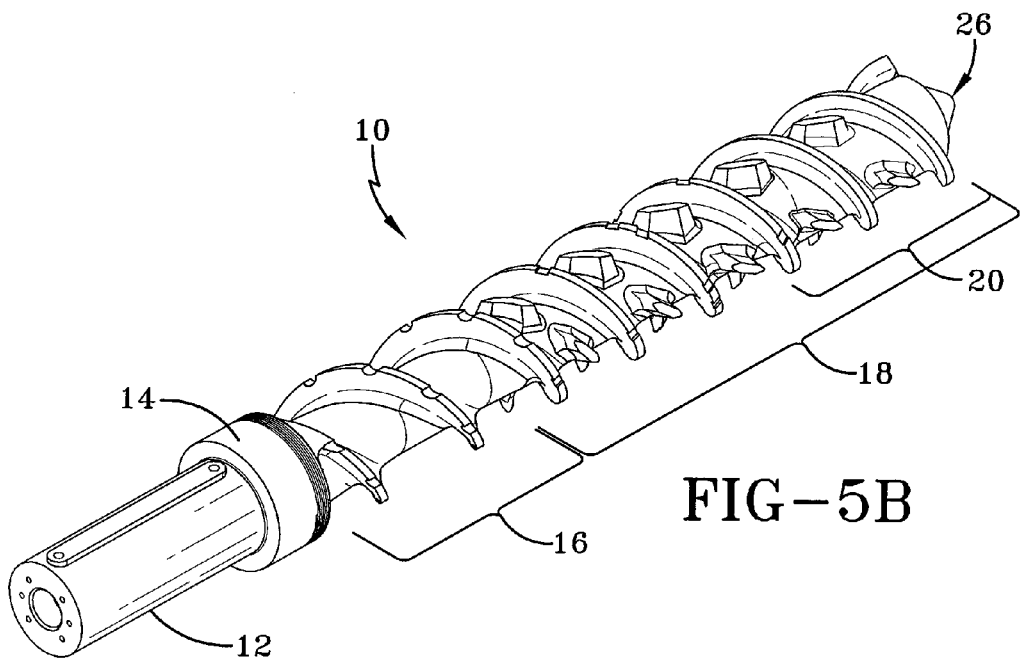

Referring now to all of the drawings and, in particular to FIG. 1, it can be seen that an extruder screw is designated generally by the numeral 10. The screw 10 is maintained in a housing or barrel section of an extruder which is typically heated and/or cooled during operation. As polymeric material such as rubber, enters the housing, the material is heated and flows through the barrel section as the screw is rotated. Material exits the barrel section and is forced through a tip/die configuration or into a mold to take on a desired final or intermediate shape.

The extruder screw 10 has a number of sections. Specifically, the screw includes a drive end 12 coupled to a drive mechanism of an extruder system. Typically the drive system or drive mechanism is powered by an electric motor, mechanical gearing and/or hydraulic systems. Extending from the drive end 12 is a sealing section 14 which separates the drive end 12 from the remainder of the extruder screw. The sealing section 14 prevents polymeric material from entering the drive mechanism. A collecting section 16 extends from the sealing section and receives polymeric material which is typically in strip, slab or other form through a hopper opening in the barrel which holds the extruder screw. A mixing section 18 extends from the collecting section 16 and further mixes the polymeric material into a desired consistency. Based on the heating/cooling applied to the barrel that holds the screw and configuration of the mixing section, the desired flow properties of the polymeric material are obtained. The mixing section 18 may include a changeable extrusion section 20 which may be provided either with a lug-free section 22 as shown in FIG. 2 or lug sections 24 as shown in FIG. 3. Extending from the extrusion section 20 is a changeable nose cone 26. The nose cone 26 interfits with the appropriate extrusion tip/die or mold configuration. Skilled artisans will appreciate that the screw 20 may be provided as a single integral piece or that the various sections may be configured to be secured to one another. This is clearly evident in FIGS. 2-4 wherein the extrusion section 20 has a threaded extension end that is receivable in an appropriate threaded receptacle of the mixing section 18. Likewise, the cone 26 is provided with a threaded fitting so as to be received in an appropriate end of the mixing section 18.

Throughout all of the sections of the extruder a root or core, designated generally by the numeral 30, extends from the sealing end 14 to the nose cone 26. The root 30 varies in diameter through the various sections so as to facilitate the mixing of the polymeric material. The root 30 includes a center line 32 which is the rotational axis of the extruder screw as it is rotated by the drive mechanism. It will be appreciated that appropriate bearings and support are provided to the extruder screw so that it rotates in a proper manner within the housing or barrel section of the extruder.

Extending radially from the root 30 is at least one flight designated generally by the numeral 34. Indeed, the flight or flights extend from the core in a quasi-helical pattern. In the embodiment shown, two flights are provided and designated by the numerals 34a and 34b. The flights have the same outer diameter and are sized to be slightly smaller than the barrel inner diameter to allow for rotation of the extruder screw within the barrel. It will be appreciated that the fit between the outer diameter of the flights and the inner diameter of the barrel is of such a close fit so as to ensure that the molten polymeric material is pushed out of the screw in a predetermined rate. In the embodiment shown, the flights are spaced about 180 degrees apart from one another so as to provide for uniform mixing. It will further be appreciated that a single flight or more than one flight may be used by the extruder screw. Each flight 34 includes a flight ridge 36 which is in close proximity to the inner diameter of the sleeve or barrel of the extruder system. The ridge or ridges 36 may be provided with notches 38 so as to allow for a back flow of polymeric material as the screw is rotated. Each flight forces the material forward toward the nose cone 26, however the notches allow some material to back track for additional mixing with other material. Channels 40 are formed between each flight ridge 36.

A plurality of lugs 50 radially extend from the root 30 and are disposed between the flights 34. In other words, each lug 50 extends upwardly from the root 30 and into the channels 40. The lugs 50 are provided in the mixing region adjacent the collecting section and may extend to the nose cone. As shown in the drawings, the lugs are positioned at 90 degree radial intervals about the root. Of course, the radial intervals can be varied as needed.

Each flight 34 has an angular orientation that facilitates the mixing of the polymeric material. Specifically, a flight angle 52 is associated with each flight 34. The flight angle 52 is determined by extending a line along the slope of each ridge and intersecting that line with the center line 32. In the embodiment shown, the flight angle varies from the sealing end to the nose cone depending upon the particular section and the mixing parameters desired. As shown in FIGS. 1A and 1B, the flight angle may range anywhere from about 120° proximal the sealing end to about 100° proximal the nose cone end.

Each lug 50 is provided with an elongate section 60 which is formed from opposed sides 62 that are connected by opposed ends 64. The sides 62 and ends 64 are terminated with a crown 66 which forms the top of each lug 50. The dimensions of the lug features vary depending on their position along the length of the screw and are based on compound evaluations to ensure adequate mixing of the compound. A lug angle 54 is associated with each lug 50 and is determined by extending a line along the slope or angular direction of each crown and intersecting that line with the center line 32. As best seen in FIG. 1B, the lugs are provided with lug angles 54 which range anywhere from about 120° starting at the end of the collecting section to about a 155° angle at the extrusion section. As can be seen from FIG. 1, the lug angles 54 are slightly different from the flight angles 52 of the flights that are immediately adjacent the lugs. It will further be appreciated that a mid-point of the lugs along the elongate section 60 may be aligned with the notches 38.

As discussed, each elongate lug 50 has a lug angle 54 with respect to the center line such that the lug angles are progressively increased from the sealing end to the nose cone end. Although the lug angles can vary as needed, in most embodiments the lug angles range from 95° to 175° with respect to the center line 32. In a similar manner, the flight angles progressively decrease from the sealing end to the nose cone end may vary and can range anywhere from 95° to about 175°. It will further be appreciated that the flight angle is configured such that each lug angle is greater than the flight angles of adjacent flights. In other words, each lug angle disposed between flights has an angle that is greater than the flight angles to which they are closest to. It will further be appreciated that the elongate sides of the lugs are substantially angularly aligned with the flights adjacent thereto. Specifically, the elongate sides and the adjacent flight angles are aligned within about 25° of each other with respect to the center line.

A further feature of the extruder screw 10 is that the height of the lugs are offset from the flights a predetermined distance. In particular, it can be seen in FIG. 1B that an offset value 70 is associated with each lug and the flights adjacent thereto. In particular, the flight offset value is the distance measured between the crown 66 and the outer diameter of the flight ridge 36. The offset value distance becomes progressively smaller along the length of the extruder screw as the material flows toward the nose cone. In particular, it can be seen that the offset value 70 at the initial position closest the collecting section is much greater than the offset value of the lugs provided in the lug section 22.

In operation, the polymeric material is fed into the mixing section 16 where it is pushed forward by the flights 34. Where notches 38 are provided in the flights 34, a small portion of the compound flows back into a wider or earlier flight section for further mixing with the polymeric material that is more recently received from the hopper. As the material is pushed forward by the flights, it enters the mixing section 18 and the lugs 50. As will be appreciated, the angular disposition of the lugs is somewhat parallel to the flights but not exactly. This slight angle differential allows for further mixing of the material as the extruder screw rotates. It will further be appreciated that the heights of the lugs are initially such that the interference is less, but gradually increases as the lugs increase in height so as to further mix the material that comes between the crown and the inner diameter of the barrel. The angular orientation of the lugs also changes as the material travels from the collecting section toward the nose cone end 32. This further mixing facilitates the properties of the polymeric material as it exits the nose cone end. It will further be appreciated that the core diameter may also vary with the changing configuration of the lugs to further facilitate mixing.

If desired in some embodiments, it will be appreciated that the lugs may be replaceable such that different angular configurations of the lugs may be utilized. This can be done so as to determine the beneficial or adverse effects of the lugs on the polymeric material flowing through the screw. Once a desired configuration is obtained, it will be appreciated that in some embodiments the lugs will be integral with the extruder screw. Likewise, it will be appreciated that a lug-free section 22 may be used in place of a lug section 24 in the mixing section 18 as deemed appropriate.

Based on the foregoing the advantages of the present invention are readily apparent. By selectively controlling and adjusting the angular and offset parameters of the lugs, a desired mixing of a polymeric material by the screw can be obtained. It has been found that use of lugs in such a configuration allow for the screw to be shortened in length in comparison to prior art screws. Moreover, the disclosed screw configuration is adaptable for cold feed screw designs. A cold feed extruder is one that accepts room temperature compound directly into the hopper/screw area of the extruder. A hot feed extruder is one that requires the compound to be heated by other means prior to entering the extruder. As a result, this configuration allows the compound to reach its optimum extrusion condition in much less time than prior art configurations. This is considered to be advantageous in that particular heat-sensitive compounds are being used. Skilled artisans will appreciate that if a polymeric material is maintained at an elevated temperature for an extended period of time that its molecular structure and suitability for a particular end use may be diminished. Accordingly, the present configuration allows for the polymeric material to quickly move through the extruder housing with minimal heat damage. It is also believed that the present configuration requires less power to operate inasmuch as the material flows more easily through the screw barrel.

Yet another advantage of the extruder screw 20 is that geometry and shape of the lugs can be changed to allow the user to alter the working characteristic of the extruder to match a particular criteria or standard. Standards or criteria of interest, for example, are the material temperature (to be measured preferably at the end of the screw), the flow rate and the quality of the mixture (viscosity, degree of shrinkage and homogeneity).

While there has been described a preferred embodiment of this invention, It will be obvious to those skilled in the art that various changes and modifications may be made therein without departing from the invention, and it is, therefore, intended that such changes and modifications fall within the scope of the invention as defined by the claims.

What is claimed is:

1. An extruder screw adapted for receipt in a barrel of an extruder comprising:
   a core extending from a sealing end to a nose cone end;
   at least one flight extending radially from said core in a helical pattern, wherein flights adjacent one another form channels therebetween; and
   a plurality of elongate lugs extending radially from said core and are disposed in said channels,
   wherein the plurality of elongate lugs comprise a shape comprising opposed ends that are connected by opposed sides, wherein the ends and the sides are terminated with a crown that forms a top of the elongate lugs, and wherein a surface area at the top of the elongate lugs is less than a surface area at the bottom of the elongate lugs,
   wherein said core has a center line and each said elongate lug has a lug angle with respect to said center line, wherein the lug angles are progressively increased from the sealing end to the nose cone end,
   wherein a flight ridge is provided by each said flight, wherein each said lug has a crown which has an offset dimension from said flight ridge, and wherein said offset dimensions are progressively decreased from said sealing end to said nose cone end.

2. The extruder screw according to claim 1, wherein each said flight has a flight angle with respect to said center line, and wherein the flight angles are progressively decreased from the sealing end to the nose cone end.

3. The extruder screw according to claim 1, wherein said lug angles with respect to said center line range from 95° to 175°.

4. The extruder screw according to claim 1, wherein said flight ridge has a plurality of notches.

5. The extruder screw according to claim 1, wherein said elongate sides of the elongate lugs are substantially angularly aligned with said flights adjacent thereto.

6. The extruder screw according to claim 1, wherein each said flight ridge has a flight angle, and wherein each said lug angle is greater than said flight angles of adjacent flights.

7. The extruder screw according to claim 1, further comprising:
   a collecting section adjacent said sealing end; and
   a mixing section disposed between said collecting section and said nose cone end.

8. The extruder screw according to claim 7, wherein said mixing section has said lugs disposed in said channels in about 90° radial increments from an end of said collecting section to said nose cone end.

9. The extruder screw according to claim 7, wherein said mixing section comprises a lug section adjacent said collecting section and an extrusion section adjacent said lug section, wherein said extrusion section includes said lugs.

10. The extruder screw according to claim 1, wherein said mixing section comprises a lug section adjacent said collecting section and an extrusion section adjacent said lug section, wherein said extrusion section is lug-free.

11. An extruder screw adapted for receipt in a barrel of an extruder comprising:
    a core extending from a sealing end to a nose cone end;
    at least one flight extending radially from said core in a helical pattern, wherein flights adjacent one another form channels therebetween; and
    a plurality of elongate lugs extending radially from said core and are disposed in said channels,
    wherein the plurality of elongate lugs comprise a shape comprising opposed ends that are connected by opposed sides, wherein the ends and the sides are terminated with a crown that forms the top of the elongate lugs, and wherein a surface area at the top of the elongate lugs is less than a surface area at a bottom of the elongate lugs, wherein said core has a center line and each said elongate lug has a lug angle with respect to said center line, and each said flight has a flight angle with respect to said center line, wherein the lug angles are progressively increased from the sealing end to the nose cone end, while the flight angles are progressively decreased from the sealing end to the nose cone end.

12. The extruder screw according to claim 11, further comprising:
   a flight ridge provided by each said flight, said flight ridge having a plurality of notches.

13. The extruder screw according to claim 11, further comprising:
   a collecting section adjacent said sealing end; and
   a mixing section disposed between said collecting section and said nose cone end.

14. The extruder screw according to claim 13, wherein said mixing section has said lugs disposed in said channels in about 90° radial increments from an end of said collecting section to said nose cone end.

* * * * *